United States Patent
Barbieri et al.

(10) Patent No.: US 9,008,582 B2
(45) Date of Patent: Apr. 14, 2015

(54) USER EQUIPMENT ENHANCEMENTS FOR COOPERATIVE MULTI-POINT COMMUNICATION

(75) Inventors: Alan Barbieri, San Diego, CA (US); Tingfang Ji, San Diego, CA (US); Peter Gaal, San Diego, CA (US); Stefan Geirhofer, San Diego, CA (US); Yichao Huang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 13/592,797

(22) Filed: Aug. 23, 2012

(65) Prior Publication Data

US 2013/0053077 A1    Feb. 28, 2013

Related U.S. Application Data

(60) Provisional application No. 61/527,468, filed on Aug. 25, 2011.

(51) Int. Cl.
| | |
|---|---|
| *H04B 1/00* | (2006.01) |
| *H04B 7/06* | (2006.01) |
| *H04L 27/26* | (2006.01) |
| *H04B 7/02* | (2006.01) |
| *H04L 5/00* | (2006.01) |

(52) U.S. Cl.
CPC .............. *H04B 7/0626* (2013.01); *H04B 7/024* (2013.01); *H04B 7/0617* (2013.01); *H04L 5/0007* (2013.01); *H04L 5/0048* (2013.01); *H04L 5/0053* (2013.01); *H04L 27/2602* (2013.01); *H04L 5/00* (2013.01)

(58) Field of Classification Search
USPC .............................. 455/63.1, 443, 67.11, 450
See application file for complete search history.

(56) References Cited

U.S. PATENT DOCUMENTS

| | | | |
|---|---|---|---|
| 8,755,365 B2 * | 6/2014 | Lee et al. ....................... 370/338 |
| 2010/0285810 A1 | 11/2010 | Ko et al. |
| 2010/0304682 A1 | 12/2010 | Choi et al. |
| 2010/0322351 A1 | 12/2010 | Tang et al. |
| 2011/0235608 A1 | 9/2011 | Koo et al. |
| 2011/0249643 A1 | 10/2011 | Barbieri et al. |

FOREIGN PATENT DOCUMENTS

WO        2012108945        8/2012

OTHER PUBLICATIONS

Baker M., "LTE-Advanced Physical Layer", IMT-Advanced Evaluation Workshop Dec. 17-18, 2009, Beijing, 9 No. REV-090003rl Dec. 17, 2009, pp. 1-48, XP002637658, Retrieved from the Internet: URL:http://www.3gpp.org/ftp/workshop/2009-12-17_ITU-R_ IMT-Adv_eval/docs/pdf/REV-090003-r1.pdf [retrieved on May 18, 2011] p. 17-p. 19.

Dahlman E., et al., "46: LTE/LTE-Advanced for Mobile Broadband" In: "4G: LTE/LTE-Advanced for Mobile Broadband", Mar. 1, 2011, Academic Press, XP55040943, ISBN: 978-0-12-385489-6 pp. 158-161,paragraph [10.2.3.2].

International Search Report and Written Opinion—PCT/US2012/052329—ISA/EPO—Nov. 15, 2012.

Samsung: "Discussion on RB Bundling for DM-RS", 3GPP Draft; R1-102187 RB Boundling, 3rd Generation Partnership Project (3GPP), Mobile Competence Centre; 650, Route Des Lucioles; F-06921 Sophia-Anti Polis Cedex; France, vol. RAN WG1, No. Beijing, china; 20100412, Apr. 6, 2010, XP050419467, [retrieved on Apr. 6, 2010] the whole document.

* cited by examiner

*Primary Examiner* — Tu X Nguyen
(74) *Attorney, Agent, or Firm* — Patterson & Sheridan, L.L.P.

(57) ABSTRACT

Certain aspects of the present disclosure provide techniques for measuring interference observed at a CoMP UE caused by neighbor base stations transmitting reference signals.

24 Claims, 6 Drawing Sheets

USER EQUIPMENT ENHANCEMENTS FOR COOPERATIVE MULTI-POINT COMMUNICATION

CLAIM OF PRIORITY UNDER 35 U.S.C. §119

The present Application for Patent claims priority to U.S. Provisional Application No. 61/527,468, entitled "USER EQUIPMENT ENHANCEMENTS FOR COOPERATIVE MULTI-POINT COMMUNICATION," filed Aug. 25, 2011, and assigned to the assignee hereof and hereby expressly incorporated by reference herein.

BACKGROUND

1. Field

Certain aspects of the present disclosure relate generally to wireless communications systems and, more particularly, to techniques for more accurately estimating interference observed by a user equipment (UE) in a cooperative multi-point (CoMP) communication system.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home Node Bs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

SUMMARY

Certain aspects of the present disclosure provide a method estimating interference observed at cooperative multi-point (CoMP) user equipment (UE). The method generally includes determining, at a user equipment (UE) served by at least one serving base station (BS), a reference signal (RS) configuration indicating resources on which one or more neighbor BSs transmit RS or data, estimating interference observed at the UE caused by the neighbor BSs, based on RS or data transmitted by the neighbor BSs on the indicated resources; computing a channel state information (CSI) using said interference estimate, and sending the CSI to the serving BS for use in coordinating transmissions with the neighbor BSs.

Certain aspects of the present disclosure provide an apparatus for estimating interference observed at cooperative multi-point (CoMP) user equipment (UE). The apparatus generally includes means for determining, at a user equipment (UE) served by at least one serving base station (BS), a reference signal (RS) configuration indicating resources on which one or more neighbor BSs transmit RS or data, means for estimating interference observed at the UE caused by the neighbor BSs, based on RS or data transmitted by the neighbor BSs on the indicated resources, means for computing a channel state information (CSI) using said interference estimate, and means for sending the CSI to the serving BS for use in coordinating transmissions with the neighbor BSs.

Certain aspects of the present disclosure provide an apparatus for estimating interference observed at cooperative multi-point (CoMP) user equipment (UE). The apparatus generally includes at least one processor and a memory coupled to the at least one processor. The at least one processor is typically adapted to determine, at a user equipment (UE) served by at least one serving base station (BS), a reference signal (RS) configuration indicating resources on which one or more neighbor BSs transmit RS or data, estimate interference observed at the UE caused by the neighbor BSs, based on RS or data transmitted by the neighbor BSs on the indicated resources, compute a channel state information (CSI) using said interference estimate, and send the CSI to the serving BS for use in coordinating transmissions with the neighbor BSs.

Certain aspects of the present disclosure provide a computer-program product for estimating interference observed at cooperative multi-point (CoMP) user equipment (UE). The computer-program product generally includes a computer-readable medium having instructions stored thereon, the instructions executable by one or more processor for determining, at a user equipment (UE) served by at least one serving base station (BS), a reference signal (RS) configuration indicating resources on which one or more neighbor BSs transmit RS or data, estimating interference observed at the UE caused by the neighbor BSs, based on RS or data transmitted by the neighbor BSs on the indicated resources, computing a channel state information (CSI) using said interference estimate, and sending the CSI to the serving BS for use in coordinating transmissions with the neighbor BSs.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
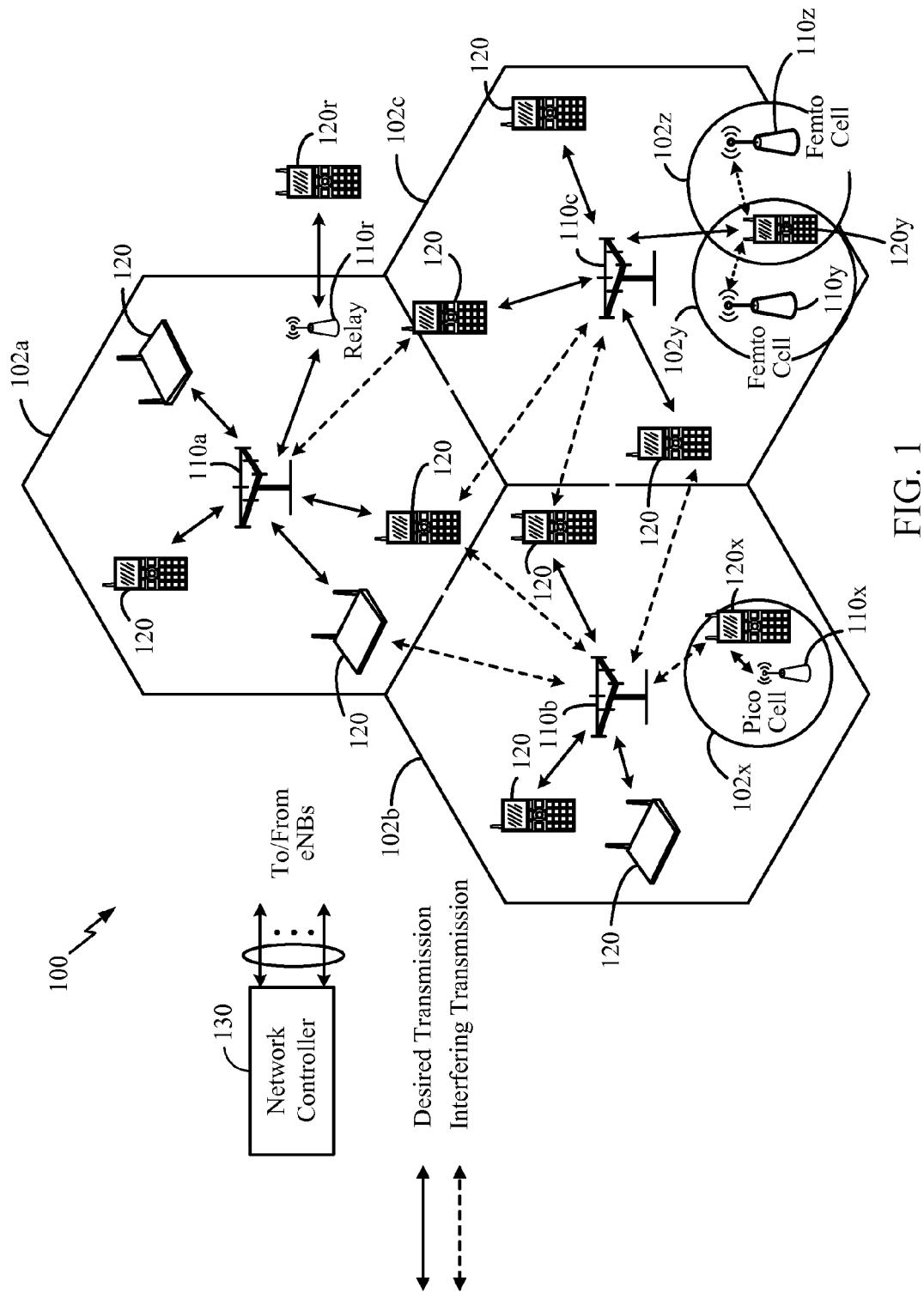
FIG. 1 illustrates a multiple access wireless communication system, in which certain aspects of the present disclosure may be utilized.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K)

orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
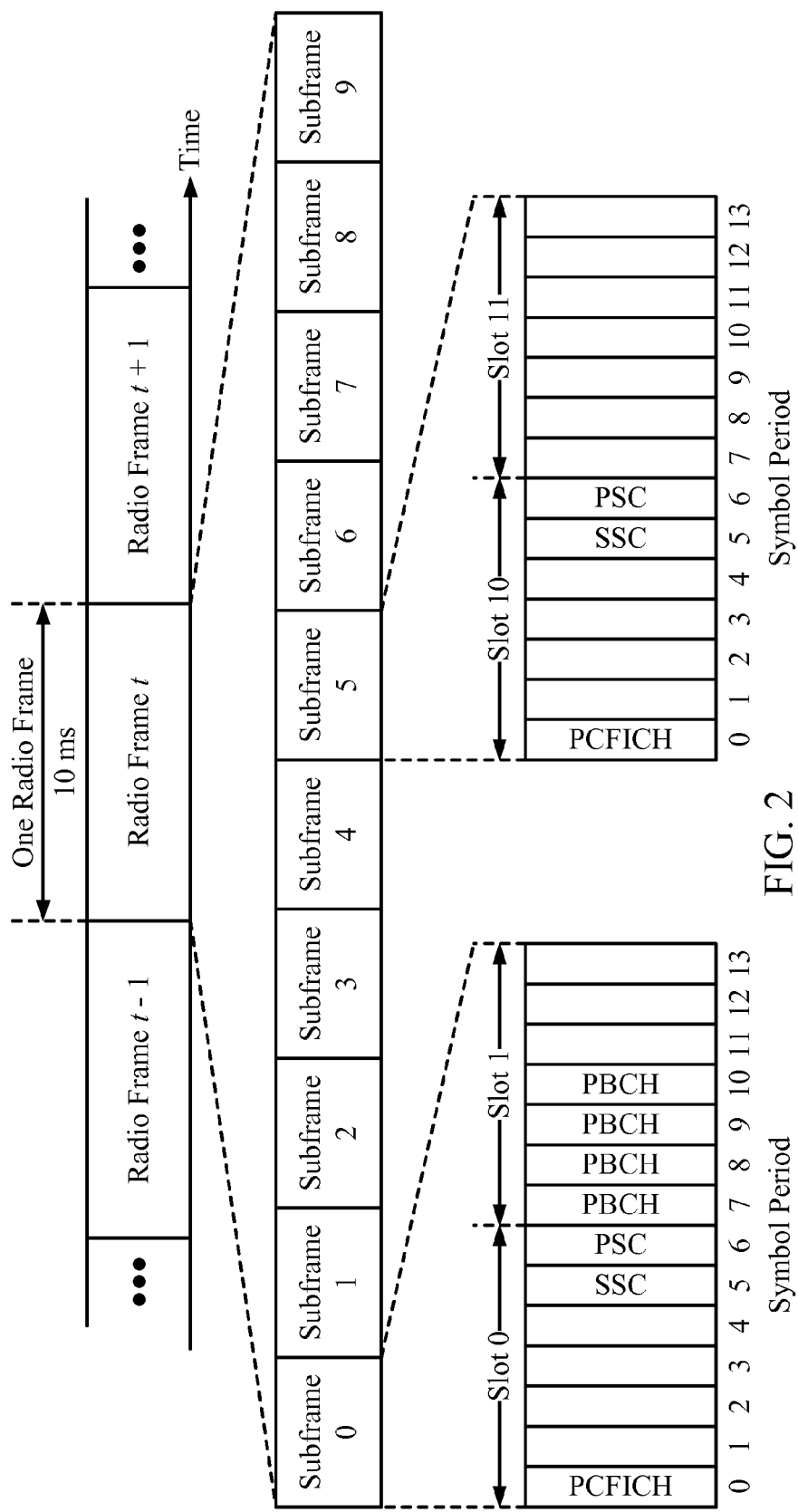
FIG. 2 illustrates an example frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
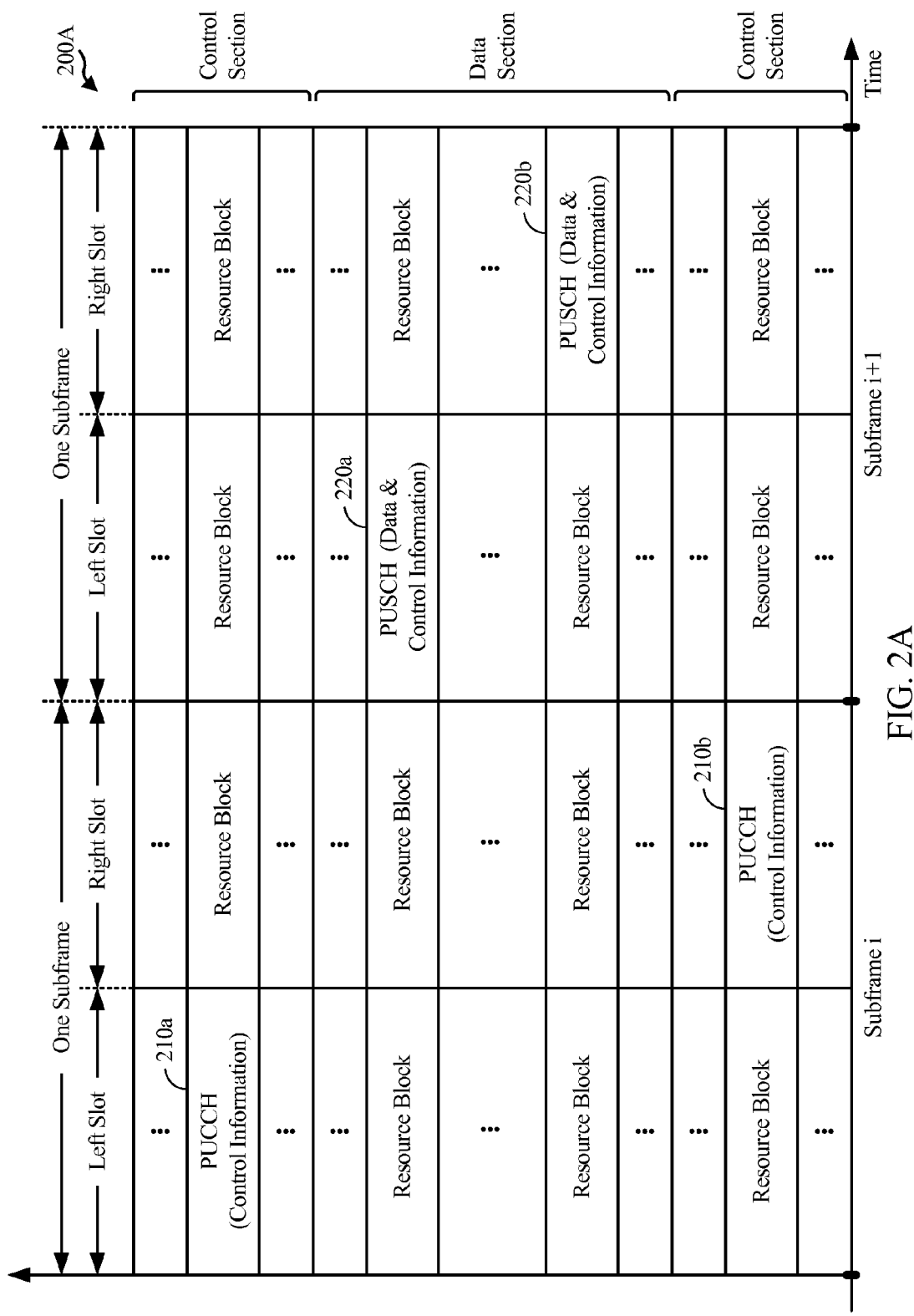
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 3:
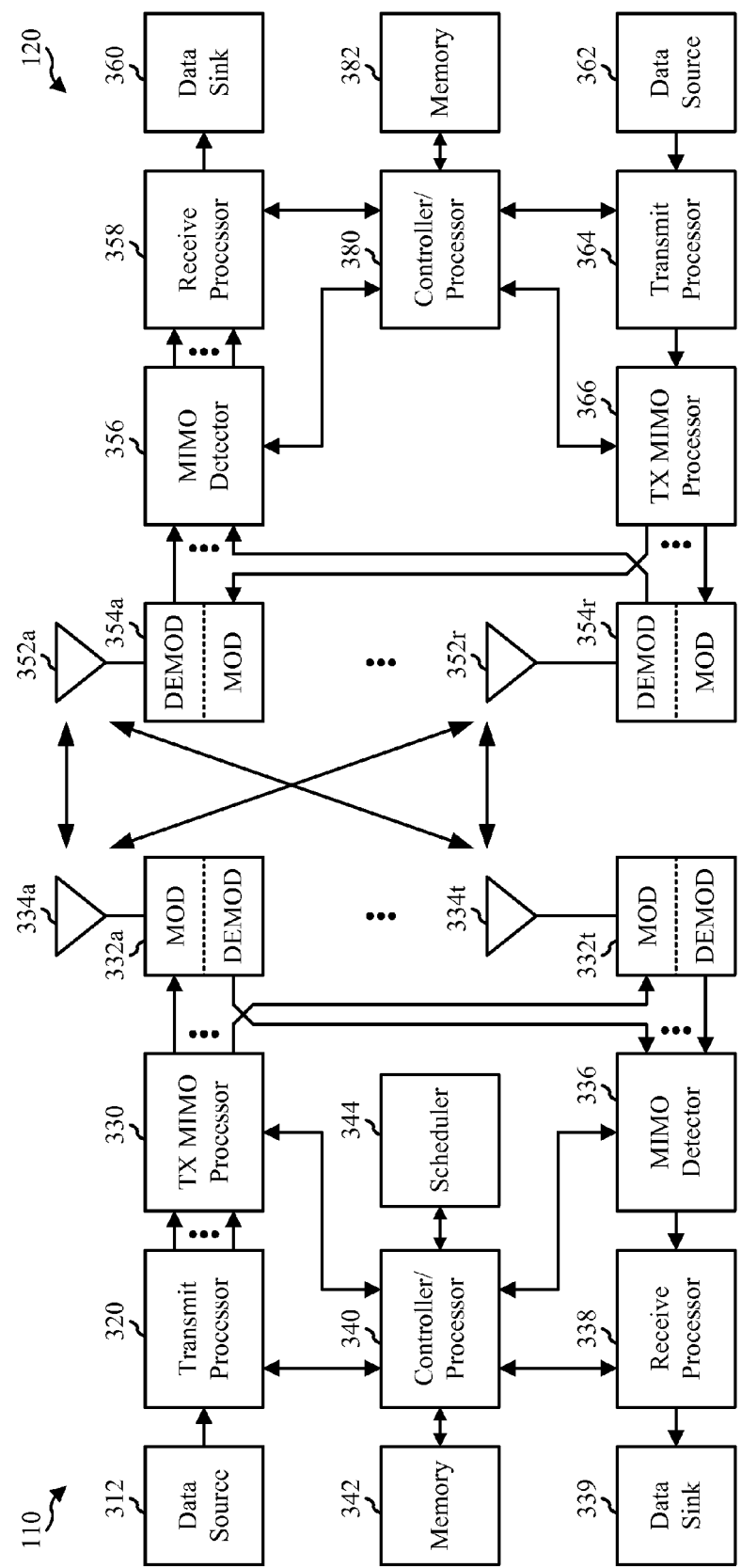
FIG. 3 is a block diagram of a wireless communication system, in which certain aspects of the present disclosure may be utilized.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general and At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Example UE Enhancements for CoMP

In many cases, performance of edge users may be significantly improved through downlink Cooperative Multi-Point (CoMP) communications. In CoMP communications, multiple nodes may cooperate to serve a given UE.

Various types of CoMP techniques are available. Joint-processing (JP) is a cooperation type where data packets for the same UE are provided to multiple nodes. Examples of JP include joint transmission (JT) and dynamic cell switching (DCS). JP requires a fast backhaul, which may increase backhaul overhead and may require network topology upgrades. Coordinated scheduling (CS) and coordinated beam-forming (CBF) are other types of cooperation, where only a serving cell has data packets for the UE. CS and CBF involve suitable UE selection by a base station, beam selection, power control (for example, Boolean, wherein interference is transmitting using full power or silenced on some resources), and improved link adaptation.

Aspects of the present disclosure provide methods for feedback enhancements for CS/CBF schemes. A "victim" BS (e.g., pico in a macro-pico scenario subject to interference by a higher power node) may make scheduling decisions conditioned on one or more interfering "aggressor" BSs (e.g., macro nodes). For example, a victim BS may implicitly or explicitly know the scheduling decisions (e.g., beams and transmission powers) of neighboring aggressor BSs and may take this information into considering when coordinating beamformed transmissions with neighbor BSs.

Depending on a particular implementation and scheme, all or a subset of nodes participating in CoMP may make scheduling decisions prior to transmission. In any case, aspects of the present disclosure provide improved interference estimation accuracy by a UE. For example, an advanced UE acting in accordance with certain aspects of the present disclosure may report channel state information (CSI) which reflects scheduling decisions of interfering, neighbor cells.

Interference experienced by a UE may depend on transmit power and beams employed by interferers. Interference experienced by a UE may be unpredictable because interfering cells may change beams and transmit power on a transmission time interval (TTI) basis. This may not be an issue for demodulation, since interference estimation may take place in the same subframe as the transport block to decode. Interference experienced by a UE may, however, create a mismatch for CSI reporting.

A more accurate knowledge of interference at the time of transmission by a serving BS may increase performance. Increased performance may occur due to improved beam selection, link adaption, and multiuser diversity (MUD) gain. For example, a more accurate knowledge of interference experienced at a UE by one or more neighbor base stations may improve a UE's CQI estimate. Additionally, a more accurate knowledge of interference may allow beam selection such that the transmit signal from the serving BS and interference from the neighbor base stations are orthogonal.

Figure 4:
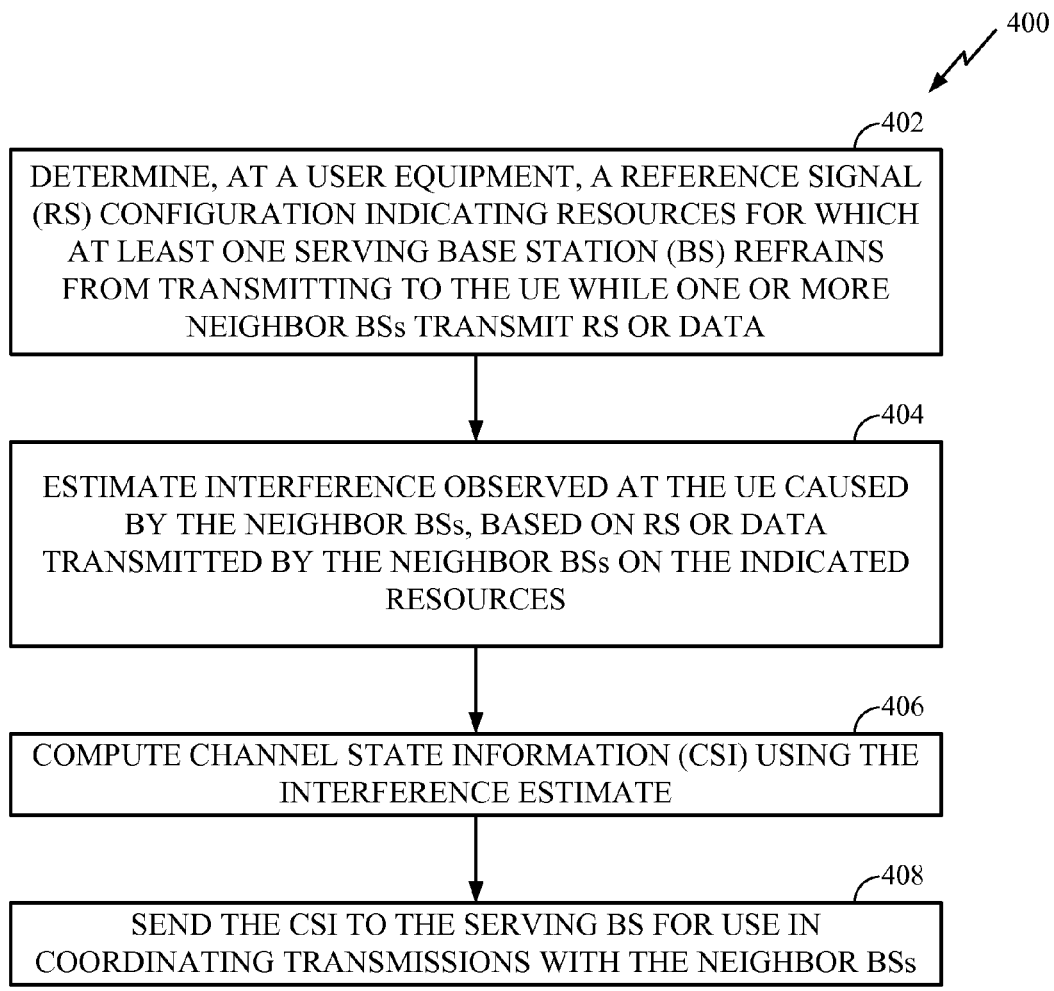
FIG. 4 illustrates example operations that may be performed by a user equipment (UE) to estimate interference caused by neighbor base stations (BSs), in accordance with aspects of the present disclosure.

FIG. 4 illustrates example operations 400 in accordance with aspects of the present disclosure. The operations 400 may be performed, for example, by a UE to provide enhanced channel state feedback. Such feedback may be used, for example, by a serving BS to coordinate with neighbor BSs when scheduling beamformed transmissions to the UE.

At 402, a UE may determine a reference signal (RS) configuration indicating resources for which at least one serving base station (BS) refrains from transmitting to the UE while one or more neighbor BSs transmit RS or data.

At 404, a UE may estimate interference caused by the neighbor BSs, based on RS or data transmitted by the neighbor BSs using the indicated resources. At 406, a UE may compute a channel state information (CSI) using said interference estimate. According to certain aspects, the RS or data may be transmitted using beamforming on the indicated resources.

At 408, a UE may send the CSI to the serving BS for use in coordinating transmissions with the neighbor BSs. According to certain aspects, the serving BS may use the CSI to coordinate with the neighbor BSs for scheduling beamformed transmissions to the UE.

According to aspects of the present disclosure, interference estimation by a UE may be based on a suitable reference signal (RS) configuration. For example, interference estimation may be based on a channel state information-reference signal (CSI-RS) configuration provided by a BS.

According to certain aspects, a CSI-RS configuration message may include an additional variable indicating which muting configuration may be used by the UE for interference estimation. For example, the UE may receive a set of resource elements (REs) where the serving BS is muting by refraining from transmitting reference signals. While the serving BS is muting, neighbor BSs may be transmitting CSI-RS using beamforming on the indicated resources, allowing the UE to estimate interference from all other transmitting nodes. According to aspects, adjacent victim BSs may mute on different CSI-RS configurations.

Since interference may change on subframe by subframe bases, according to aspects of the present disclosure, a UE may not average estimated interference across different subframes. This may be explicitly signaled to the UE in the radio resource control (RRC) message or implicitly assumed.

According to aspects of the present disclosure, CSI-RS may be used for interference estimation only. In other words, CSI-RS may be detached from demodulation reference signals (DM-RS-based demodulation, for example, with transmission mode 9). For example, a new "TM4b" mode may be similar to TM4, but interference may be estimated as described above.

According to aspects of the present disclosure, multiple REs per resource block (RB) may be defined to improve interference estimation accuracy. For example, a new reference signal may have increased overhead with respect to CSI-RS. Alternatively, a UE may merge multiple CSI-RS configurations together for the sake of interference estimation.

A CoMP UE may be informed by the serving cell (e.g., via a new radio resource control information element-RRC IE) about the physical resource block (PRB) bundling size employed by aggressor BSs. The UE may be informed about the number of consecutive PRBs where the beams and transmit powers chosen by neighbor BSs may remain constant. Interference, thus, may change relatively slowly across those PRBs, since changes may be only due to frequency-selecting fading. A UE may use this information to decide how many consecutive PRBs to average when estimating an interference covariance matrix.

If a UE has multiple aggressors and each of them is using a different bundling size, the RRC message may include a list of bundling size (optionally with cell ID of corresponding aggressor cell) or the serving cell may pick one common value (e.g., the minimum among the bundling sizes used by most dominant aggressors for that UE). The UE may take this information into account when computing interference. For example, the UE may average across N consecutive PRBs, for the sake of interference estimation, where N represents the bundling size received from serving cell.

In some cases, a BS may receive a bundling size indicating a number of consecutive physical resource blocks (PRBs) over which at least one of beams and transmit powers used by at least one neighbor BS remains constant. In such cases, interference may be estimated assuming that interference can change drastically at the boundaries of bundled sets of consecutive PRBs.

According to a resource quality indicator-reference signal (RQI-RS) alternative, a special CSI-RS configuration (or multiple configurations) may be shared among the BSs. At the first transmission of such CSI-RS after pre-scheduling, a macro BS may transmit a pseudo-random sequence on the CSI-RS REs, in some cases, beamformed according to beams and transmit powers selected by the pre-scheduler. The pico UEs may use these REs to estimate interference.

According to a PDSCH-based alternative, a macro BS may transmit data on the physical downlink shared channel (PDSCH) in subframe n using selected beams and transmit powers. Scheduling decisions may apply to both subframe n and some future subframes. Pico BSs may configure their Rel-11 UEs to use REs where PDSCH has been transmitted by macro BSs, e.g. subframe n above, for interference estimation. In this case, REs corresponding to the special muted CSI-RS configuration do not coincide with a pseudo-random sequence from the macro, but with actual PDSCH REs. In some cases, an RS configuration may define multiple resource elements (REs) per resource block (RB) per antenna port on which to estimate interference caused by the neighbor BSs.

In some cases, it may be desirable to also capture interference between nodes of the same power class (e.g., inter-pico interference). In such cases, some nodes may behave as both victim and aggressors. According to an aspect, a UE may want to make sure that the estimated interference associated with a pico BS (or BSs) captures interference coming from neighbor pico BSs as well as interference from macro BSs.

To more accurately estimate interference, adjacent victim BSs may mute on different CSI-RS configurations, to ensure that only signals from the serving cell is absent from the REs used by the UE for interference estimation. All other nodes should be allowed to transmit (as long as they decided to schedule data transmission) to capture the complete interference experienced at the UE.

According to existing Rel-10 RS locations, CSI-RS density is relatively low, and may not be sufficient for both channel and interference estimation. Accordingly, in some cases, enhanced feedback provided by a UE should capture pre-coded interference from the interferer and include sub-band precoding matrix indicator (PMI), CQI, rank indicator (RI).

For RS coordination between a macro and pico base station, a first set of CSI-RS, referred to as CSI-RS_m3, may correspond to a macro BS transmitting precoded CSI-RS. The precoded CSI-RS may be signaled as zero-power RS for rate matching purposes for UEs not scheduled for transmissions. CSI-RS_m3 may be used for interference estimation by victim UEs. A second set of CSI-RS, referred to as CSI-RS_p2, may correspond to zero power RS for a pico base station and may also correspond to CSI-RS_m3. CSI-RS_p2 may be signaled as RS for Nt estimation for CoMP UEs. A suitable CSI-RS configuration may be semi-statically coordinated among macro base stations and communicated to the pico BSs. It may be preferable for all macro base stations in an area to have the same CSI-RS_m3.

The CQI configuration of a CoMP UE may be an extension of enhanced inter cell interference coordination (eICIC) CSI configuration. For example, a CoMP UE may estimate different CSI values (CSI_1, CSI_2, etc.) based on the transmitting base stations. A CSI value, CSI_3, may be associated with Nt estimation over CSI-RS-p2.

The CoMP UE may transmit feedback on a physical uplink control channel (PUCCH) or a physical uplink shared channel (PUSCH). Precoded interference may change drastically from one instance to the next and, therefore, aperiodic feedback may be more suitable.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Figure 4A:
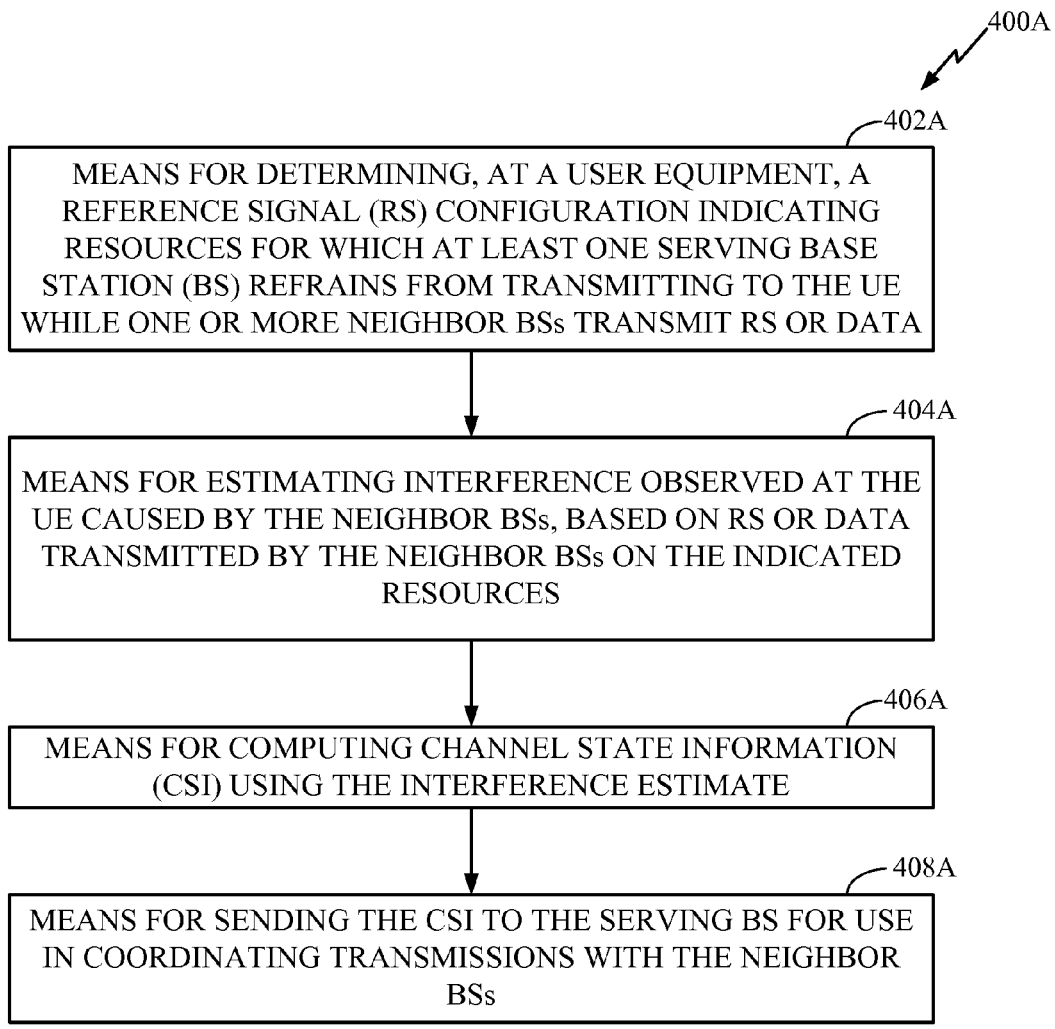
FIG. 4A illustrates example means capable of performing the operations illustrated in FIG. 4.

The various operations of methods described above may be performed by any suitable means capable of performing the corresponding functions. Generally, where there are operations illustrated in Figures, those operations may have corresponding counterpart means-plus-function components with similar numbering. For example, operations 400 illustrated in FIG. 4 correspond to components 400A illustrated in FIG. 4A. The means may include various hardware and/or software component(s) and/or module(s), including, but not limited to a circuit, an application specific integrated circuit (ASIC), or processor. For example, means for transmitting may comprise a transmitter, such as the transmitter unit 254 of the receiver system 250 (e.g., the access terminal) depicted in FIG. 2 or the transmitter unit 222 of the transmitter system 210 (e.g., the access point) shown in FIG. 2. Means for receiving may comprise a receiver, such as the receiver unit 254 of the receiver system 250 depicted in FIG. 2 or the receiver unit 222 of the transmitter system 210 shown in FIG. 2. Means for determining and/or means for performing may comprise a processing system, which may include one or more processors, such as the processor 270 and RX data processor 260 of the receiver system 250 or the processor 230 of the transmitter system 210 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication, comprising:
determining, at a user equipment (UE) served by at least one base station (BS), a reference signal (RS) configuration indicating resources on which one or more neighbor BSs transmit RS or data;
estimating interference observed at the UE caused by the neighbor BSs, based on RS or data transmitted by the neighbor BSs on the indicated resources, wherein the estimating comprises:
  receiving a bundling size indicating a number of consecutive physical resource blocks (PRBs) over which at least one of beams and transmit powers used by at least one neighbor BS remains constant; and
  estimating interference assuming that interference can change drastically at the boundaries of said sets of consecutive PRBs;
computing a channel state information (CSI) using said interference estimate; and
sending the CSI to the serving BS for use in coordinating transmissions with the neighbor BSs.

2. The method of claim 1, wherein:
the neighbor BSs use beamforming on the indicated resources; and
the CSI is sent to the serving BS for use in coordinating transmissions with the neighbor BSs.

3. The method of claim 1, wherein the RS comprises channel state information-reference signal (CSI-RS).

4. The method of claim 3, wherein the determining comprises decoding a value that indicates a particular CSI-RS configuration, provided by the serving BS.

5. The method of claim 4, wherein the particular C SI-RS configuration comprises a zero-power CSI-RS configuration for the serving cell.

6. The method of claim 4, further comprising receiving, from the serving BS, a muted CSI-RS configuration which is different than the muted CSI-RS configurations provided by adjacent BSs to their UEs.

7. The method of claim 6, wherein each BS mutes on both the CSI-RS configuration provided to its own UEs and the CSI-RS configurations provided by adjacent BSs to their UEs.

8. The method of claim 4, wherein the UE is configured to use any transmission mode between 1 and 8 and uses the provided CSI-RS configuration.

9. The method of claim 1, wherein the RS configuration defines multiple resource elements (REs) per resource block (RB) per antenna port on which to estimate interference caused by the neighbor BSs.

10. The method of claim 1, wherein multiple RS configurations are provided to the UE to estimate interference caused by the neighbor BSs.

11. The method of claim 1, wherein the UE receives the bundling size from the serving BS via a suitable radio resource control (RRC) information element.

12. An apparatus for wireless communication, comprising:
means for determining, at a user equipment (UE), a reference signal (RS) configuration indicating resources on which one or more neighbor BSs transmit RS or data;
means for estimating interference observed at the UE caused by the neighbor BSs, based on RS or data transmitted by the neighbor BSs on the indicated resources, wherein the means for estimating comprises:
  means for receiving a bundling size indicating a number of consecutive physical resource blocks (PRBs) over which at least one of beams and transmit powers used by the neighbor BS remains constant; and
  means for estimating interference assuming that interference can change drastically at the boundaries of said sets of consecutive PRBs;
means for computing a channel state information (CSI) using said interference estimate; and
means for sending the CSI to the serving BS for use in coordinating transmissions with the neighbor BSs.

13. The apparatus of claim 12, wherein:
the neighbor BSs use beamforming on the indicated resources; and
the CSI is sent to the serving BS for use in coordinating beamformed transmissions with the neighbor BSs.

14. The apparatus of claim 12, wherein the RS comprises channel state information-reference signal (CSI-RS).

15. The apparatus of claim 14, wherein the means for determining comprises means for decoding a value that indicates a particular CSI-RS configuration, provided by the serving BS.

16. The apparatus of claim 15, wherein the particular CSI-RS configuration comprises a zero-power CSI-RS configuration for the serving cell.

17. The apparatus of claim 15, further comprising means for receiving, from the serving BS, a muted CSI-RS configuration which is different than the CSI-RS configurations provided by adjacent BSs to their UEs.

18. The apparatus of claim 17, wherein each BS mutes on both the CSI-RS configuration provided to its own UEs and the CSI-RS configurations provided by adjacent BSs to their UEs.

19. The apparatus of claim 15, wherein the UE is configured to use any transmission mode between 1 and 8 and uses the provided CSI-RS configuration.

20. The apparatus of claim 12, wherein the RS configuration defines multiple resource elements (REs) per resource block (RB) per antenna port on which to estimate interference caused by the neighbor BSs.

21. The apparatus of claim 12, wherein multiple RS configurations are provided to the UE to estimate interference caused by the neighbor BSs.

22. The apparatus of claim 12, wherein the UE receives the bundling size from the serving BS via a suitable radio resource control (RRC) information element.

23. An apparatus for wireless communication, comprising:
at least one processor adapted to:
 determine, at a user equipment (UE) served by at least one serving base station (BS), a reference signal (RS) configuration indicating resources on which one or more neighbor BSs transmit RS or data;
 estimate interference observed at the UE caused by the neighbor BSs, based on RS or data transmitted by the neighbor BSs on the indicated resources, wherein the estimate is performed by:
  receiving a bundling size indicating a number of consecutive physical resource blocks (PRBs) over which at least one of beams and transmit powers used by the neighbor BS remains constant; and
  estimating interference assuming that interference can change drastically at the boundaries of said sets of consecutive PRBs;
 compute a channel state information (CSI) using said interference estimate; and
 send the CSI to the serving BS for use in coordinating transmissions with the neighbor BSs; and
a memory coupled to the at least one processor.

24. A computer-program product comprising a computer readable medium having instructions stored thereon, the instructions executable by one or more processors for:
 determining, at a user equipment (UE), a reference signal (RS) configuration indicating resources for which at least one serving base station (BS) refrains from transmitting to the UE while one or more neighbor BSs transmit RS or data;
 estimating interference observed at the UE caused by the neighbor BSs, based on RS or data transmitted by the neighbor BSs on the indicated resources, wherein the estimating comprises:
  receiving a bundling size indicating a number of consecutive physical resource blocks (PRBs) over which at least one of beams and transmit powers used by the neighbor BS remains constant; and
  estimating interference assuming that interference can change drastically at the boundaries of said sets of consecutive PRBs;
 computing a channel state information (CSI) using said interference estimate; and
 sending the CSI to the serving BS for use in coordinating transmissions with the neighbor BSs.

* * * * *